(No Model.) 2 Sheets—Sheet 1.
P. J. DOYLE, F. E. THRALL & M. B. WILKINSON.
SAWMILL DOG.

No. 473,658. Patented Apr. 26, 1892.

Witnesses.
A. Ruppert.
A. L. Hough.

Inventors.
Patrick J. Doyle.
Forrest E. Thrall.
Marion B. Wilkinson.
per Franklin H. Hough
Atty.

(No Model.) 2 Sheets—Sheet 2.
P. J. DOYLE, F. E. THRALL & M. B. WILKINSON.
SAWMILL DOG.
No. 473,658. Patented Apr. 26, 1892.
Fig. 5.
Fig. 6.
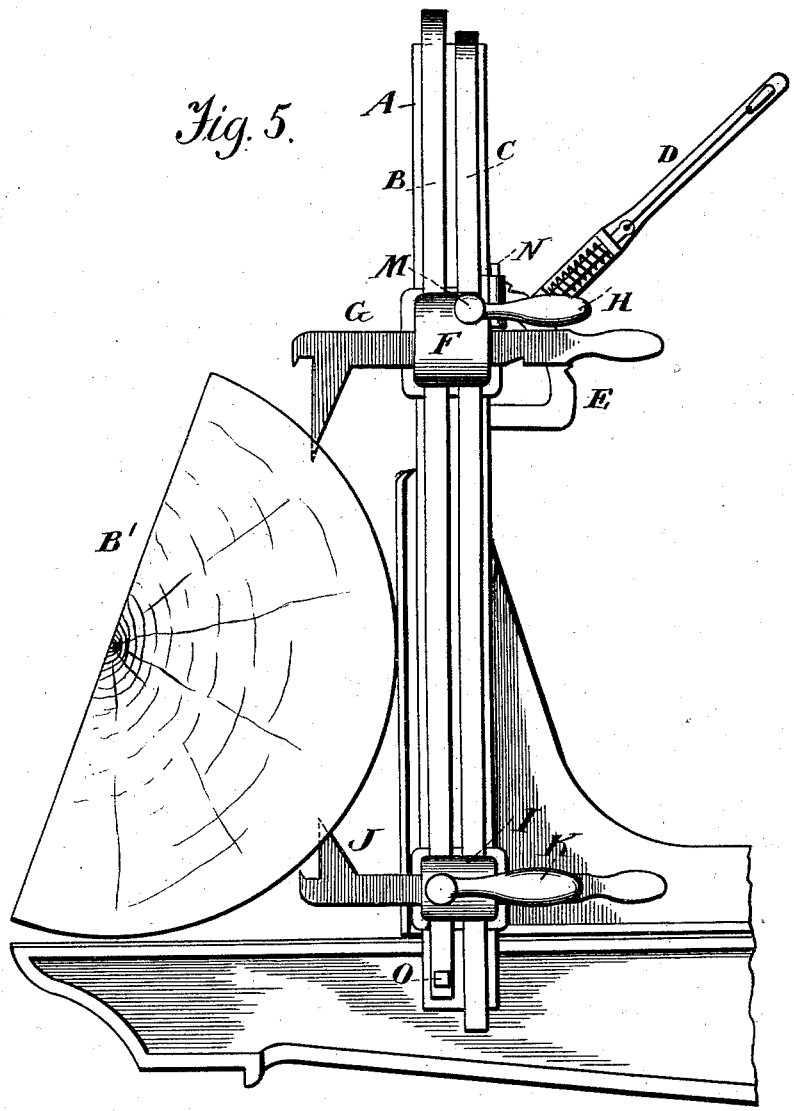
Witnesses.
A. Ruppert
A. L. Hough
Inventors.
Patrick J. Doyle.
Forrest E. Thrall.
Marion B. Wilkinson.
per Franklin H. Hough
Atty

UNITED STATES PATENT OFFICE.

PATRICK J. DOYLE, FORREST E. THRALL, AND MARVIN B. WILKINSON, OF ASHEVILLE, NORTH CAROLINA.

SAWMILL-DOG.

SPECIFICATION forming part of Letters Patent No. 473,658, dated April 26, 1892.

Application filed July 2, 1891. Serial No. 398,309. (No model.)

*To all whom it may concern:*

Be it known that we, PATRICK J. DOYLE, FORREST E. THRALL, and MARVIN B. WILKINSON, citizens of the United States, residing at Asheville, county of Buncombe, and State of North Carolina, have invented a new and useful Sawmill-Dog, to be known as the "Doyle Patent Duplex Mill-Dog," of which the following is a specification.

Our invention relates to improvements in sawmill-dogs whereby the upper and lower dogs are fastened to the log or cant by one movement of the lever, and is especially adapted to prevent the springing of timber and to quarter-sawing.

Figure 1:
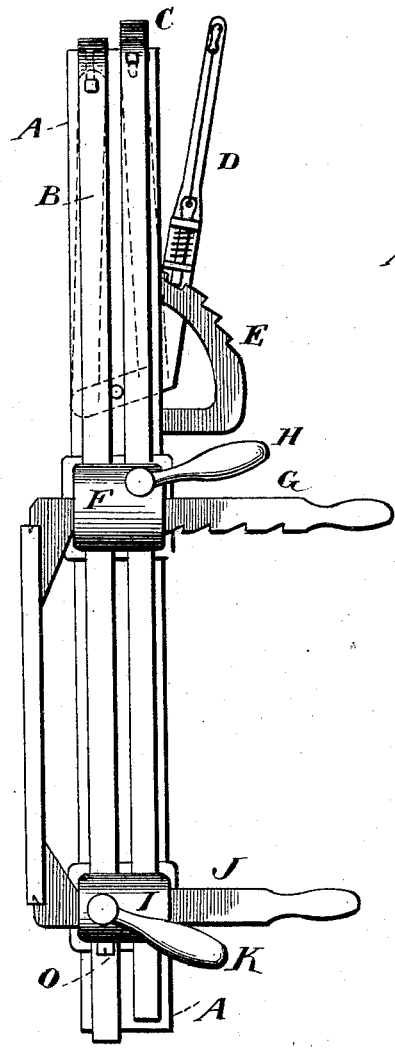
Figure 2:
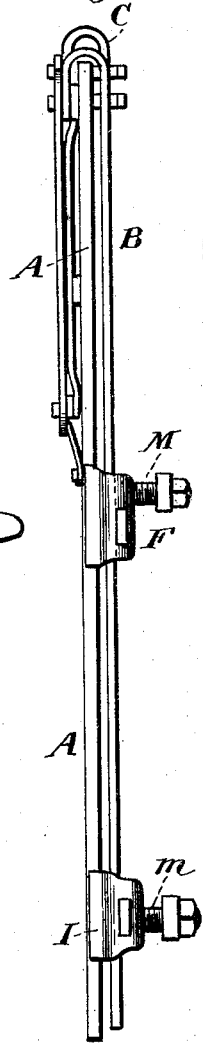
Figure 3:
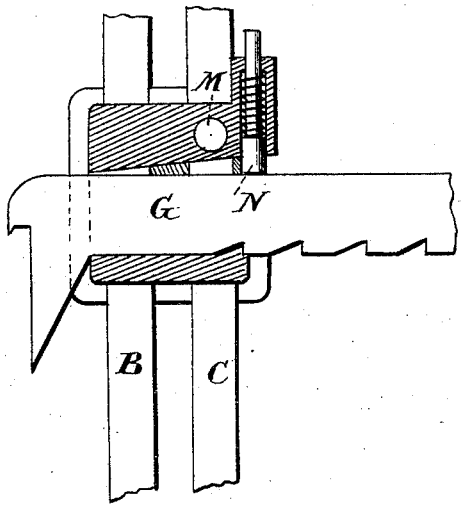
Figure 4:
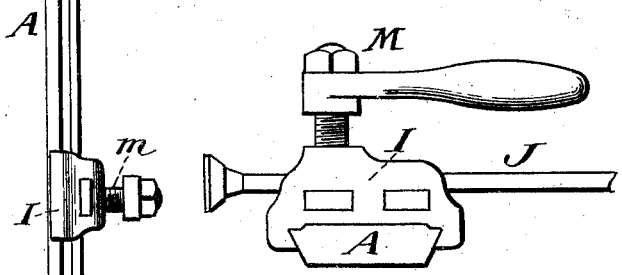

Figure 1 is a side view showing the last board of a cant as held by the dog. Fig. 2 is a front view showing lever connections. Fig. 3 is a sectional view of upper head and dog. Fig. 4 is a bottom view of lower head. Fig. 5 is a view as in use when quarter-sawing. Fig. 6 is a view of main bar.

Similar letters refer to similar parts throughout the several views.

Main bar A is a bar of steel five inches wide, three-fourths of an inch thick and five feet long, slotted in the upper end, as shown in Fig. 6, and is beveled on its edges to fit sliding heads F and I. This bar is readily bolted to any style of knee. The lever D is pivoted to main bar A and connected with sliding bars B and C by connections shown by dotted lines in Fig. 1. The movement downward, or toward the operator of lever D, which is held in position by the quadrant E, raises bar B and lowers bar C, to which the cast-steel heads I and F are respectively bound by levers K and H, acting on the screws M. In the lower head the lever K binds the steel dog J to the head I, and also binds the head I to the bar B by one movement. For plain sawing the lower head is left down, resting on the pin O in bar B, and the dog J is pulled back to the shoulder and bound by lever K. The upper head F slides up and down on bar A, and is held in any position desired by lever H binding it to bar C. The steel dog G slides loosely in head F and can be pushed forward by raising the back end, but is kept in position by the pin N, Fig. 3, which is pressed down on top of dog by spiral spring, (shown on Fig. 3,) thus engaging the notches in lower edge of dog with the offset cast in head F, so that the dog cannot be moved forward without raising the back end, and when the dog is bound to the log this is impossible.

What we claim is—

1. The combination, with the bar A, slotted at the upper end, of the sliding bars B C, bolts connecting the parallel portions of said bars and passed through the slots of the bar A, having parallel portions and a curve at one end over the slots of the bar A, and the lever D, pivoted to the bar A and connected to the sliding bars to move them simultaneously in opposite directions, and the heads carrying dogs, one of which is notched, and operating means, substantially as described.

2. The combination, with the bar A, slotted at the upper end, of the sliding bars B C, bolts connecting the parallel portions of said bars and passed through the slots of the bar A, having parallel portions and a curve at one end over the slots of the bar A, and the lever D, pivoted to the bar A and connected to the sliding bars to move them simultaneously in opposite directions, the heads, the screws, the dogs, and the levers mounted to bind the dog to the head and the heads to the sliding bar at one movement, substantially as described.

P. J. DOYLE.
F. E. THRALL.
M. B. WILKINSON.

Witnesses:
J. MORROW,
C. Q. ADAMS.